Patented May 22, 1928.

1,670,307

UNITED STATES PATENT OFFICE.

WILLIAM T. LITTLE, OF WESTFIELD, NEW JERSEY.

PROCESS FOR SEPARATING TIN AND ARSENIC COMPOUNDS.

No Drawing.   Application filed November 27, 1925.  Serial No. 71,838.

This invention relates to an improved method of separating chemical compounds having different melting points and solubilities.

The invention relates more particularly to a process for separating tin compounds from arsenic compounds when the two are present in strongly alkaline solutions.

Generally stated, the process in a preferred form thereof comprises effecting the separation of soluble salts or other compounds by concentrating their solution while maintaining the temperature above the melting point of one of them until precipitation of another contained in solution occurs, and washing the precipitated salt or salts or other compounds with a washing liquor above the melting point of the salt or salts or other compounds whose melting point has been exceeded. The principle embodied in the above process may also be applied in another manner by concentrating the solution of mixed salts or other compounds until a mixture of salts or other compounds is precipitated and then washing the mixed salts or other compounds with a liquid hot enough to melt and take up and dissolve one of them while permitting the other or others to remain undissolved or only partly dissolved. When proceeding in the manner last indicated mixed solid salts or compounds may be used as the starting materials instead of solutions.

The practice of the above processes is illustrated below by the separation of tin and arsenic from strongly alkaline solutions, as solutions of sodium hydroxide. The starting material employed in this specific embodiment of the principle of my invention is a sodium hydroxide solution comprising sodium stannate and sodium arsenate, although the practice of the process can be extended, as will be understood from the foregoing, to the separation of other substances.

In various chemical processes solutions strongly alkaline with caustic soda and containing arsenic and tin compounds are obtained, and it is a further object of the present invention to obtain pure tin compounds from these solutions. Hitherto, the separation of the tin from the arsenic compounds has been conducted with indifferent success by one of the two following methods.

In one method the solution is concentrated by boiling until it is at a specific gravity of approximately 1.2 and then allowed to cool to atmospheric temperatures which allows the sodium arsenate to crystallize out as a bulky precipitate of hydrated sodium arsenate. While theoretically no tin is precipitated by this method, in practice it has been found that the arsenic precipitate carries a considerable amount of tin by absorption which cannot be recovered by any known method of washing. Therefore, this method involves the loss of considerable tin values.

In the second method of separation the tin content of the solution is precipitated by adding to the solution $CO_2$ gas or a soluble bicarbonate such as sodium bicarbonate. In this process the tin is precipitated as hydrated oxide of tin in the form of a voluminous, finely divided precipitate. It is found that even with the greatest of care in precipitating and with extreme persistence in subsequent washing of the precipitate, that the hydrated oxid of tin precipitated persists in containing considerable amounts of arsenic, which renders the hydrated oxid of tin of an inferior quality.

I have now discovered that if tin and arsenic compounds are brought into solutions strongly alkaline with caustic soda and the sodium stannate crystals which separate in such solutions are removed and washed free from the mother liquor by means of wash water strongly alkaline with caustic soda, while in the meantime the temperature is kept above about 85.5° centigrade, the melting point of sodium arsenate, then the sodium stannate crystals thus obtained will be practically free from arsenic compounds. The solution strongly alkaline with soda and containing arsenic and tin is preferably concentrated by boiling until the free NaOH content is above 30 grams—preferably 35 to 40—per 100 cc. of solution. This serves to free practically all the tin from the solution as sodium stannate crystals. These crystals are filtered off hot and washed with a hot NaOH solution containing above 30 grams—preferably 35 to 40—of sodium hydroxide per 100 cc. of solution. Any other alkali, as for example KOH, solvent, or other liquid capable of dissolving or melting out the sodium arsenate above its melting point may be used to remove any adhering mother liquor containing arsenic. The concentration of the alkali used for washing may obviously vary somewhat, but should always be sufficient to prevent solution of the tin compounds. The temperature of the alkali should be about or above 85.5° centigrade, the melting point of sodium arsenate. When the solution from which the tin compounds have been separated is allowed to cool, the sodium arsenate separates at once as hydrated arsenate of soda and may be separated from the free NaOH present in the solution by filtration or otherwise.

My improved process of separation above described is not confined to solutions obtained by concentration by boiling but may be applied to all mixtures of tin and arsenic salts in caustic soda solutions containing more than about 30 grams of free NaOH per 100 cc., in whatsoever way such solutions may be obtained.

A modification of the process is to obtain the sodium stannate crystals as described above but without the indicated extreme care to keep the crystals at all times above about 85.5° centigrade, and then to wash the sodium stannate crystals which will be contaminated with sodium arsenate crystals with a solution containing more than about 30 grams of NaOH per 100 cc. at a temperature above 85.5° centigrade. This hot solution of caustic will melt and dissolve the sodium arsenate crystals but will not appreciably dissolve the sodium stannate crystals.

The solution of arsenic and tin used above may also be concentrated until both sodium stannate and sodium arsenate are precipitated without regard to the regulation of the temperature. Thereafter the mixed crystals may be washed with sodium hydroxide of the concentration indicated above and at a temperature about or above 85.5° centigrade. The process of separation may likewise be applied to mixed tin and arsenic compounds, as sodium stannate and sodium arsenate, without first placing these salts in solution. For example, the mixed solid, or mixed solid and melted salts or other compounds may be treated by the hot strong alkali to effect separation.

What I claim is:

1. The process of separating sodium stannate from sodium arsenate from a mixture including them which comprises leaching the mixture with a liquid sufficiently elevated in temperature to melt the sodium arsenate.

2. The process of separating sodium stannate from sodium arsenate from a mixture including them which comprises treating the mixture with an alkali metal hydroxide heated sufficiently to melt sodium arsenate.

3. The process of separating sodium stannate from sodium arsenate from a mixture including them which comprises leaching the mixture with sodium hydroxide heated sufficiently to melt sodium arsenate.

4. The process of separating sodium stannate from sodium arsenate from a mixture including them which comprises treating the mixture with a sodium hydroxide solution at a temperature not lower than about 85.5° C.

5. The process of separating sodium stannate from sodium arsenate from a mixture including them which comprises leaching the mixture with a solution of a strength of more than 30 grams of sodium hydroxide per 100 cubic centimeters of solution and at a temperature above about 98.5° C.

6. The process of separating tin compounds from arsenic compounds present in an alkaline solution which comprises concentrating the solution to the point of precipitation of the tin compound, thereafter separating the precipitated tin compound and washing it at a temperature above about 85.5° C.

7. The process of separating tin compounds from arsenic compounds present in an alkaline solution which comprises concentrating the solution until the tin separates as sodium stannate, and thereafter separating and washing the sodium stannate with alkali solution above about 85.5° C.

In testimony whereof I affix my signature.

WILLIAM T. LITTLE.